United States Patent Office 3,591,629
Patented July 6, 1971

3,591,629
CATALYST SELECTIVITY IN PURIFYING TEREPHTHALIC ACID
Arnold F. Stancell, Highland, and Raymond J. McGowan, Wayne, N.J., assignors to Mobil Oil Corporation
No Drawing. Filed Aug. 19, 1968, Ser. No. 753,772
Int. Cl. C07c 51/42
U.S. Cl. 260—525                                    15 Claims

ABSTRACT OF THE DISCLOSURE

The sorption of a phenylbenzene, as exemplified by biphenyl and 1,3-terphenyl, by a Group VIII metal catalyst alters the selectivity of the catalyst for promoting various reactions. In the purification of crude terephthalic acid in dispersed form (e.g., vaporized at elevated temperature in a superheated steam carrier) by contact in the presence of hydrogen with a catalyst, such as palladium supported on activated carbon particles, a phenylbenzene-treated catalyst provides superior yields of highly purified product by minimizing the conversion or degradation of terephthalic acid while effecting high percentage conversions of the small amounts of para-carboxybenzaldehyde contaminating the crude acid.

BACKGROUND OF THE INVENTION

Field of the invention

This invention relates to a method for changing the activities of certain free metal catalysts for promoting certain reactions especially for altering the selectivity of the catalyst to repress unwanted side reactions without substantially interfering with the desired reaction. In a particular embodiment, it is concerned with the catalytic purification of crude terephthalic acid by contact with such a treated catalyst to thereby minimize the loss or degradation of terephthalic acid while retaining the characteristic high conversion of impurities, such as p-carboxybenzaldehyde, into substances which are readily separable from the terephthalic acid product.

Description of the prior art

Terephthalic acid is a compound of increasing commercial importance as exemplified by its growing use in large quantities in the production of fiber and film-forming polyesters, such as polyethylene terephthalate of high molecular weight. For many purposes, including the use of such polyesters in textile fibers and magnetic tape bases, an extremely high degree of polymer purity is necessary to obtain the desired color, dyeing characteristics and/or excellent physical and electrical properties. Heretofore, most commercial production of such pure polyesters has involved an indirect route of conversion of the terephthalic acid to its dimethyl ester and purification of the ester by recrystallization or distillation prior to transesterification of the dimethyl ester with a glycol (e.g., ethylene glycol) and polymerization of the transesterification product. More recently, it has been found advantageous to directly esterify terephthalic acid of high purity with the glycol; hence efficient and economical methods for the purification of terephthalic acid per se are now of prime importance.

Terephthalic acid can be manufactured by several processes known in the art, as exemplified by the catalytic oxidation of p-xylene according to the processes described in U.S. Pats. Nos. 2,833,816, 2,853,514, 3,036,122 and others.

The major impurities present in terephthalic acid prepared by the catalytic oxidation of p-xylene result from incomplete oxidation; and the crude product generally contains about 0.5 to 3% of p-carboxybenzaldehyde as well as other intermediate oxidation by-products, usually including p-toluic acid. Leaching of this crude product with hot acetic acid or another suitable agent may be employed to reduce the content of such impurities and provide a leached crude material typically containing about 0.2 to 1.5% p-carboxybenzaldehyde. Also a much smaller amount of ash is typically present in the form of one or more metal compounds derived from the residue of a metal salt oxidation catalyst (e.g., cobalt acetate tetrahydrate) and/or the corrosion of process equipment, silica and organic decomposition products.

A particularly troublesome by-product of p-xylene oxidation is p-carboxybenzaldehyde which acts as a chain stopper during subsequent polyesterification of the terephthalic acid and, either alone or in combination with other intermediate oxidation products, imparts undesirable coloration to the resulting polyester product. Moreover, it is difficult to remove this aldehyde compound from terephthalic acid by conventional techniques, particularly in meeting certain commercial specifications for a maximum p-carboxybenzaldehyde content in the range of 15 to 50 parts per million by weight (p.p.m.).

Various procedures have been proposed for the purification of terephthalic acid, including fractional recrystallization, leaching, sublimation with fractional condensation, and catalysis involving a hydrogenation catalyst (e.g., palladium) in the presence of hydrogen; but, under certain conditions, these methods have their limitations in respect to effectiveness, cost or operating difficulties encountered, etc. For example, some of the aforesaid catalytic treatments are excellent in almost completely eliminating the p-carboxybenzaldehyde impurity, but some tendency toward the undesirable conversion of terephthalic acid is encountered in certain instances. One particular embodiment of the instant invention is directed at minimizing such product losses while maintaining at high level of purification, particularly in respect to p-carboxybenzaldehyde removal.

SUMMARY OF THE INVENTION

The present invention is concerned with the treatment of catalytic metals of Group VIII of the Periodic Table of Elements by intimately contacting the finely divided metal with a phenylbenzene; and it also relates to the catalytic purification of terephthalic acid with such treated materials by treating a dispersion of a crude terephthalic acid containing a minor proportion of p-carboxybenzaldehyde by contact with particles of a solid contact agent comprising a finely divided metal of Group VIII in the presence of hydrogen and the phenylbenzene, and thereafter recovering from said dispersion a purified terephthalic acid of substantially lower p-carboxybenzaldehyde content than said crude acid.

Narrower aspects of the invention relate to palladium as the preferred metal catalyst which is desirably supported in extended form on particles of an inert solid carrier material, as particularly exemplified by carbon particles, biphenyl and terphenyls as the preferred treating agents; the quantities of phenylbenzene sorbed by the contact agent; pretreatment of the contact agent prior to use in the purification process, and various preferred reaction conditions for the purification of terephthalic acid.

These and other features of the invention as well as its objects and advantages will be apparent to those skilled in the art upon consideration of the general and detailed disclosure hereinafter.

DESCRIPTION OF SPECIFIC EMBODIMENTS

Alteration of the selectivity or balance of catalytic activities displayed by the free (i.e., chemically uncombined) metals of Group VIII of the Periodic Table of Elements by treatment with phenylbenzenes is involved in the present invention. This control of catalyst selectivity permits the repression or substantial elimination of undesired side reactions involving a principal component of the charge mixture without significantly affecting the desired high degree of catalytic conversion of a very minor component of the charge mixture.

The catalytically active component of the contact agent may comprise one or more of the metals of Group VIII of the Periodic Table of Elements in metallic or elemental form. The "noble metals" of higher atomic numbers and higher molecular weight in that group are preferred, as exemplified by ruthenium, osmium, iridium, rhodium, palladium and platinum, alone or in mixtures or in alloys with these or other metals. Palladium is particularly preferred for the purification of terephthalic acid.

While a finely divided metal alone may be used as the contact material, its effectiveness is usually enhanced when it is disposed on solid particles of an inert carrier or support material as this generally produces a substantial increase in the surface area of active metal exposed to the reaction mixture. For example, a fine palladium powder typically has a surface area of about 30 square meters per gram, whereas in the extended form of a palladium-on-carbon catalyst, the surface area is about 120 square meters per gram of palladium. Carbonaceous materials such as activated carbon, powdered charcoal, etc. are particularly suitable supporting materials for the active component but various other inert carrier materials, as exemplified by alumina or silica-alumina, may also be used. The content of the active agent in the contact material may range from about 0.001 to 15% or more of the total weight, and very good results are obtainable with contact material containing from about 0.1 to about 10% by weight of palladium on powdered activated carbon. The preparation of such composite contact agents is well known and a sizable number are readily available in prepared form as they are frequently used in the catalytic processing of petroleum hydrocarbons, hydrogenation, etc. It may be desirable to further lower the concentration of the active metal in some cases (e.g., in a fixed bed catalytic reaction) by mixing the composite catalyst with a large proportion of another inert substance such as sand, marble chips, glass beads, etc. usually after the phenylbenzene treatment.

Phenylbenzenes suitable for treating the metal catalysts include benzenes having one or more phenyl substituents attached to the benzene ring, as exemplified by biphenyl, 1,2-, 1,3- and 1,4-terphenyls (diphenyl benzenes), quaterphenyls and quinquephenyls, etc. Among the latter, may be mentioned o,o'-quaterphenyl, p,p'-quaterphenyl and m-quinquephenyl. In general, the terphenyls and biphenyl are preferred for the purpose. Also, there are reasons to believe that the effects of a terphenyl treatment are of somewhat longer duration under severe catalytic reaction conditions than in the case of a biphenyl treatment of the catalyst.

The contact agent may be treated with the phenylbenzene in the dispersed state; and the dispersion may be in the form of a solution of the aromatic hydrocarbon in any suitable solvent or of a vapor phase dispersion of the phenylbenzene. Preferential or selective sorption of the phenylbenzene takes place as is apparent from the observations that treating solutions are practically exhausted of their phenylbenzene content during the treatment rather than depositing only the small amount of the phenylbenzene solute contained in the relatively small amount of solution which remains on the contact mass when the treating solution is drained off.

In vapor treatments, suitably elevated temperatures are employed to produce substantial vaporization of the phenylbenzene, which may often be accomplished at temperatures below the boiling point. To counteract any possible significant reduction in the desired type of catalyst activity resulting from exposure of the catalyst to the elevated temperatures, it is contemplated that it may be desirable to carry out the vapor phase pretreatment in the presence of hydrogen and/or an inert gas such as nitrogen. However, the need for this precaution has not been established.

Combination treatments may also be employed with the contact agent treated sequentially, first with vaporized phenylbenzene and then, after cooling, with a solution of phenylbenzene in a hydrocarbon solvent. Further, the contact agent may consist of a physical mixture of a batch of catalytic material pretreated with a solution of the phenylbenzene and a batch which has been subjected to vapor treatment.

The phenylbenzene is preferably sorbed by the catalytic material in a pretreatment prior to the use of the contact agent for catalyzing a reaction in order that the full benefits of the treatment of the instant invention may be obtained from the moment that the catalyic reaction is initiated, especially since the catalyst is displaying maximum activity then. In general, the pretreatment may be performed in either the reactor in which the catalytic agent may be employed or in a separate vessel. However, it is often possible also to treat the contact agent in situ during the catalytic reacion. For example, the phenylbenzene may be vaporized and injected into a charge of crude terephthalic acid undergoing purification over a contact agent containing a Group VIII metal, or the solid phenylbenzene may be added to the crude acid and vaporized jointly therewith. It is usually desirable to complete such in situ treatments as early as possible during the catalytic reaction in order to obtain as much benefit from the catalyst treatment as possible, but this poses no significant problems inasmuch as the sorption of the phenylbenzene by the contact agent occurs very rapidly, at least in the case of vapor phase operations.

The amount of phenylbenzene deposited on the contact agent may be as little as 1% of the weight of the catalytic metal content thereof. However, larger amounts are usually employed to obtain the full benefits of the invention, as for instance, more than 10%, and good results are obtainable with the depositions of the phenylbenzene of about double the weight of the catalytic metal. Even larger amounts may be employed provided that the phenylbenzene deposits do not become so thick as to mask or otherwise reduce the activity of the contact agent for promoting the desired reaction.

In catalytic reactions, the treated contact agent may be employed as a fixed and still bed of solid particles through which the reaction mixture is flowing, or finely divided particles of the contact material of suitable small size may be suspended in and carried by either a gaseous or liquid stream containing the reactants. For illustration, solid particles of contact agent suspended in a vapor stream desirably have an average particle size smaller than 600 microns. Also, in vapor phase operations, the gaseous charge mixture may be passed through a fixed, dense phase fluidized bed of the contact agent; alternatively, it is possible to provide countercurrent contact of larger particles of the contact agent falling downwardly through a vapor charge flowing upward at a moderate velocity by selecting a contact material of suitable particle size and weight as well as using a sufficiently low gas velocity in a reaction chamber provided with means for charging particulate solids at the upper end and for their removal at the lower end.

In fixed bed processing, two or more reaction chambers arranged in parallel may often be desirable so that continuous operations may be maintained by diverting the charge mixture to a second reactor while the bed of contact material in the first reactor is either being regenerated or replaced with a fresh bed of treated contact material.

The purification of terephthalic acid involves highly selective catalysis in which a high degree of conversion of the unwanted p-carboxybenzaldehyde occurs even though this substance is present in low concentration (e.g., usually less than about 2% of the raw material) and wherein there is a minimal conversion or degradation of the terephthalic acid undergoing purification; accordingly a good yield of a product of high purity is obtainable. This is accomplished by dispersing the crude solid terephthalic acid either by vaporization or by solution in a suitable solvent liquid and contacting the resulting dispersion at elevated temperature with a catalytic agent comprising a treated Group VIII metal in the presence of hydrogen, and this contact treatment is followed by recovery of the purified terephthalic acid. In the case of vapor state treatments, the use of an inert gaseous carrier material is often advantageous in facilitating the vaporization and transport of terephthailc acid, and steam is especially suitable for the purpose as it eliminates or minimizes any tendency toward dehydration at high temperatures of terephthalic acid to anhydride material which usually has an undesirable color.

In a preferred embodiment in which sublimation is utilized, the crude terephthalic acid is vaporized in a hot gaseous mixture containing a substantial proportion of superheated steam and a small amount of hydrogen; the resulting vapor mixture is contacted with pretreated palladium or another noble metal of Group VIII as the active catalyst which is advantageously supported on an inert solid carrier material; then, after separation from the catalytic material, the effluent vapor is cooled to effect fractional condensation of purified terephthalic acid in solid form while the uncondensed gaseous material containing most of the conversion products formed in the treatment is withdrawn.

Although terephthalic acid sublimes without melting, it becomes quite tacky and particles tend to agglomerate at temperatures of 450° F. and higher; therefore, it is preferable in vapor phase operations to charge the crude material in the form of finely divided particles in a non-tacky condition, that is at ambient temperature or at an elevated temperature which is below the tackiness range, into a stream of entrainer or carrier gas which is flowing through a pipe or other conduit at a transport velocity whereby the solid acid particles are immediately entrained and transported in suspension in the carrier gas.

When the purification of terephthalic acid is carried out with the contact agent entrained or suspended in the dispersion of crude acid, the solid contact agent can be introduced by any convenient method, such as by mixing it with the crude acid prior to vaporization, or by mixing it with the solution after the crude acid has been dissolved in a solvent for a liquid phase treatment or by injecting it, together with the hydrogen or entrainer gas or both.

Hydrogen gas is incorporated in the reaction mixture at a rate of at least about 0.2 standard cubic foot (s.c.f.) per pound of crude acid and usually at least about 0.5 s.c.f. Larger amounts of hydrogen (e.g., about 1 to 10 s.c.f.) are generally preferred for there are indications that hydrogen tends to counteract the usual gradual decrease in catalyst activity for the conversion of p-carboxybenzaldehyde and thus prolongs the catalyst life. However, extremely high concentrations of hydrogen apparently produce no additional benefits.

In vapor phase operations, it is generally desirable for a number of reasons to use a gaseous entrainer or carrier which is inert or nonreactive with the crude terephthalic acid and the contact agent. The gaseous material is customarily preheated and thus provides at least part of the heat of sublimation of the crude acid. In addition, it is desirably introduced at transport velocity, that is a gas velocity sufficient to immediately entrain and transport the crude acid particles in a suspension of either the dilute or dense phase type. However, it is desirable to have the crude acid particles in dilute phase suspension at the time when most of the acid is vaporized, usually in a heated pipe coil, and this may be accomplished by introducing more of the gaseous entrainer downstream of the point where the crude acid particles were charged. During vaporization, the gaseous entrainer has another desirable effect in that its partial pressure lowers the temperature required for vaporizing terephthalic acid. Nitrogen or other inert gases may be utilized as the entraining agent but steam, desirably in superheated form, is greatly preferred because the moisture therein minimizes the tendency of terephthalic acid to dehydrate at high temperature and clean steam is usually available at low cost. The steam, of course, may be introduced in admixture with other inert gases. When steam is employed for the purpose, it is desirable to have at least about 0.03 mol of steam present per pound of terephthalic acid (5:1 steam:acid molar ratio). At the time most of the acid is vaporized, at least double this amount of steam is present in preferred embodiments of the invention. While the charging rate may be one or more mols of steam per pound of the acid, such high steam rates are generally uneconomical.

For vapor phase treatments, the reaction temperature should be maintained above the dew point of the gaseous reaction mixture and below the level at which substantial decomposition of terephthalic acid begins to occur. In general, temperatures of about 600 to 800° F. are suitable for the purpose. In the case of liquid phase treatments, temperatures in the range of about 75 to 550° F. may be utilized.

Vapor phase reactions according to the present process may be carried out over a wide range of elevated pressures extending up to 100 or more pounds per square inch gage pressure but atmospheric or slight superatmospheric pressures are generally preferable to minimize the operating difficulties in these high temperature reactions. In the case of liquid phase treatments wherein the crude terephthalic acid is dissolved in water or a suitable organic solvent, such as acetic acid, a substantial superatmospheric pressure is maintained on the reaction vessel in order to keep the solvent in the liquid phase at the selected reaction temperatures.

The residence time for contact of the dispersion of the crude terephthalic acid with a solid contact agent and hydrogen is dependent upon a number of factors including the reaction temperature and the particular catalytic agent. In general, the residence time may be between about 0.01 and 10 seconds based on volumetric flow. In vapor phase treatments with a supported palladium catalyst either suspended in the gaseous charge mixture or blended with inert solid particulate matter in a fixed bed, a residence time between about 0.1 and 5 seconds is preferable. As a general rule, it is desirable to correlate the contact or residence time with the reaction temperature in order to provide as low a reaction temperature as possible in order to eliminate any possibility of discoloring the terephthalic acid product.

Following contact treatment of the mixture containing the crude terephthalic acid, the treated material is preferably filtered before it is condensed. In process embodiments in which the contact agent is dispersed and carried by the reaction mixture, such filtration is especially desirable in order not only to separate the contact material and ash from the purified acid product but also to accumulate a substantial layer or bed of particles of contact material on the filter surface. There are indications that substantial purification of the reaction mixture occurs during its passage through such a layer in the case of vapor phase treatments with entrained contact material. Any suitable filtering means can be employed for separation of the contact agent and any other solid material from the product vapors, with specific types including porous metal, woven metal screens, ceramic mesh and glass cloth filters.

Following contact with the catalytic material and preferably after separation therefrom, e.g., by the aforedescribed filtration step, the vaporized terephthalic acid in the resulting vaporous product can be separated therefrom by condensation. Fractional rather than total condensation is usually preferred in order that the purified terephthalic acid may be recovered while most of the more volatile components of the treated vapor, particularly conversion products formed in the catalytic treatment, are withdrawn in the uncondensed vapor. Although condensation of the acid can be carried out by any suitable technique, including cooling by heat exchange, it is often desirable to bring about the desired condensation by combining a cooling medium with the mixture containing the vaporized terephthalic acid. Such a cooling medium should be inert to terephthalic acid at the temperatures encountered in the present process, and is advantageously similar in nature to the inert gaseous medium used in preferred embodiments of this invention. Thus, it is generally satisfactory to inject a sufficient quantity of a cooling medium in the form of a water spray and/or relatively low temperature steam into the vaporous product mixture containing the terephthalic acid vapor to condense a substantial proportion of the acid vapor therein without causing undesirable condensation of other constituents of the process stream, e.g., steam and impurities which remain in the vapor phase at temperatures lower than the condensation point of terephthalic acid. For example, a temperature of between about 400 and about 600° F., and more specifically between 485 and 550° F. is generally preferred when condensation is carried out at approximately atmospheric pressure, although the condensation can be carried out by cooling the vaporous product mixture to any temperature which is low enough to condense terephthalic acid from the mixture. Following condensation, the solid terephthalic acid product can be separated from the cooled mixture by any appropriate method, e.g., by the use of a cyclone separator, filter or bag collector.

The terephthalic acid thus separated after the aforementioned treatment with the contact agents of this invention contains substantially smaller amounts of the impurities than the quantities originally present in the crude terephthalic acid. For example, concentrations of para-carboxybenzaldehyde in crude terephthalic acid have in many cases been reduced by more than 95% by the instant process. Moreover, it is important that this purification can be accomplished with an acceptably small conversion and loss of terephthalic acid.

In purifying terephthalic acid according to the present invention, small quantities of carbon dioxide and benzene are found in the reaction products, and in at least some instances, the products contain a greater quantity of benzoic acid than the charge. However, the reaction mechanism is not yet fully understood, hence this process should not be regarded as limited to any particular theory.

It is further contemplated that crude acid may be subjected to two or more of the catalytic purification treatments described herein in instances where the crude terephthalic acid contains an unusually high concentration of p-carboxybenzaldehyde or where a product of extremely high purity is sought.

For a better understanding of the nature, objects and advantages of this invention, reference should be had to the following examples which are of illustrative rather than limiting character and in which all proportions are set forth in terms of weight and all temperatures as degrees Fahrenheit (° F.) unless otherwise indicated herein.

To facilitate comparison, the same type of conventional hydrogenation catalyst with a 5% palladium content is employed throughout the examples hereinafter in both pretreated form according to the present invention and as an untreated control agent. The active adsorptive agent or catalytic ingredient of this composite contact material is the 5% palladium metal which is deposited on powdered activated carbon having an average particle size of the order of 40 microns in such manner as to provide an extended surface area of about 130 square meters per gram of palladium. When it is employed for purifying terephthalic acid in a fixed bed operation, this catalyst composite may be dispersed in a bed of finely divided particles of an inert solid material which is not reactive with any substance present in the reaction mixture. For example, a uniform physical mixture in the range of about 30 to 500 parts by weight of glass beads per part of the palladium-carbon composite is suitable in many instances.

EXAMPLE 1

A blend of 1 part by weight of biphenyl and 10 parts of the 5% palladium-on-carbon catalyst is loaded into a pressure vessel and heated to 700° F. in the closed vessel in the presence of a mixture of 98.5% nitrogen and 1.5% hydrogen by volume. The 700° F. temperature is maintained for a period of 10 minutes to insure complete vaporization of biphenyl, and it is noted that the pressure reaches the range of about 40–70 pounds per square inch gage (hereinafter p.s.i.g.). After the vessel is cooled to room temperature, it is opened for removal of the treated catalyst.

EXAMPLE 2

A mixture of 1 part of 1,3-terphenyl and 20 parts of another sample of the same batch of catalyst are charged into an autoclave of suitable volume to permit full vaporization of the terphenyl; then the vessel is heated to 640° F. and kept at that temperature for a period of 10 minutes under the same gaseous atmosphere and other treating conditions essentially like those of Example 1.

EXAMPLE 3

A quantity of 250.8 milligrams (mg.) of biphenyl is dissolved in 100 ml. of cyclohexane at room temperature. After cooling this solution to room temperature, 5.0 grams of a second batch of the palladium-carbon composite particles are added to the solution with stirring; then the solid contact agent is filtered out of the solution and dried overnight by aspirating air at room temperature through the filter cake. It is found that the substantial volume of cyclohexane filtrate contains only 9.7 mg. of biphenyl; thus 241.1 mg. of the latter compound is adsorbed on the palladium-carbon particles, or a pickup of 4.8% based on the initial weight of the particles as a result of the solution treatment.

EXAMPLE 4

The procedure of Example 3 is repeated using 100 ml. of cyclohexane solution with a content of 500 mg. of biphenyl and the same catalyst in producing a treated catalyst containing 9.0% of deposited biphenyl based on the dry weight of the palladium-carbon composite, while 50.9 mg. of the biphenyl remains in the filtered solvent.

EXAMPLE 5

The procedure of Example 3 is repeated with 251 mg. of 1,3-terphenyl in solution in the cyclohexane instead of the biphenyl in preparing another treated catalyst having 4.9% of terphenyl deposited on a sample of the second batch of the supported palladium catalyst. Only 6 mg. of unadsorbed terphenyl is found in the filtrate.

EXAMPLE 6

A treated catalyst with a 9.6% pickup of 1,3-terphenyl is obtained by employing 499.7 mg. of terphenyl in 100 ml. of cyclohexane in a treatment which is otherwise similar to Example 5 except that determination indicates the terphenyl content of the filtered spent solvent to be 20.9 mg.

To demonstrate the improved selectivity of contact agents treated according to the present invention on the purification of terephthalic acid, the following illustrative examples and comparative controls are run using samples of a crude terephthalic acid produced by the cobalt-catalyzed oxidation of p-xylene and having a p-carboxybenzaldehyde (PCB) content of 5500 p.p.m. and a small amount of ash containing 25 p.p.m. of cobalt calculated as the metal. Particles of the crude acid are introduced by means of a rotary feeder at charge rates described hereinafter and ambient temperature into a small conduit where they are entrained in a stream of superheated steam flowing at a rate of 50 mols per mol of terephthalic acid under a slight superatmospheric pressure (e.g., less than about 5 p.s.i.g.) and also containing a small amount of hydrogen. While being conveyed in suspension in the hot entrainer gas mixture, the solid particles of the crude acid are subjected to further heating while passing through a pipe within an electrically heated furnace in which the catalytic reactor is located, and vaporization of the crude acid is complete prior to reaching the reactor.

Supported on a 200-mesh metal screen in the reactor, is a fixed bed of 0.9 inch diameter and 6-inch depth containing 0.6 gram of the palladium-on-carbon catalyst in uniform physical admixture with 85 grams of glass beads of 470 micron average diameter in order to effectively disperse the catalyst. Prior to charging the terephthalic acid vapor to the reactor, the contact agent is preheated to operating temperature while the entire apparatus is being purged with superheated steam. In the purification operation, the mixture of hydrogen, steam and crude acid vapor flows downwardly through the contact mass which is maintained at an average temperature of 705° F., and the residence time, based on volumetric flow, of vapor in the bed is 0.35 second.

The effluent gaseous mixture from the reactor is subjected to essentially total condensation of its content of normally solid or liquid components by cooling first to a temperature of about 120° F. at atmospheric pressure in a water-jacketed condenser and then to about 80° in an air-cooled condenser from which the uncondensed vapors or gases are vented after passing through a filter paper which prevents the loss of any entrained solid particles. All material condensing in both condensers is collected and combined in preparing samples for analytical determinations from which the data tabulated in the examples hereinafter are computed.

For the purpose of appraising catalyst performance at various stages in the runs, several sets of the aforesaid two condensers are employed. After the first set of condensers is used to condense the total condensible products obtained from processing a quantity of crude terephthalic acid (TPA) amounting to 83 grams per gram of the catalyst based on the untreated palladium-carbon composite weight, the reactor effluent is diverted to the second set of condensers while the next 167 grams of crude acid per gram of catalyst is being treated and, in some instances, a third set of condensers is utilized for collecting the condensates during a final period in which the throughput amounts to 87 more grams of crude acid per gram of catalyst in the reactor.

EXAMPLE 7

Under the aforementioned conditions, 38 grams per hour of the crude terephthalic acid and 2.8 s.c.f. of hydrogen per pound of the crude acid are charged along with the steam to a contact mass containing a sample of the first batch of untreated palladium-on-carbon catalyst (control) mixed with glass beads in one case and a similar dispersion in the other case of this catalytic material after vapor phase treatment with biphenyl according to Example 1. The following results are calculated from analyses of the total products condensed during successive stages of the process.

| | Wt. of TPA processed— g./g. of Pd/C catalyst | Percent PCB removal | | Percent TPA loss | |
|---|---|---|---|---|---|
| | | Untreated catalyst | Biphenyl treated catalyst | Untreated catalyst | Biphenyl treated catalyst |
| Initial | 83 | 99.5 | 98.4 | 29.7 | 5.4 |
| Next | 167 | 99.1 | 95.6 | 2.8 | 1.6 |
| Do | 87 | 97.3 | 93.4 | 2.6 | |

From the above figures, it is apparent that a very high p-carboxybenzaldehyde conversion or removal is obtained with both catalysts, and the control or untreated catalyst displays a slight superiority in this regard. However, the catalyst treated with biphenyl displays a marked improvement in selectivity in minimizing the undesired conversion of terephthalic acid and thus provides a distinct improvement in economy particularly in the early stages when catalyst activity is very high.

EXAMPLE 8

The procedure of Example 7 is repeated under the same conditions except for employing the catalyst of Example 2 pretreated with terphenyl vapor instead of biphenyl treated catalyst with the following results:

| | | Percent PCB removal | | Percent TPA loss | |
|---|---|---|---|---|---|
| Wt. of TPA processed—g./g. of Pd/C catalyst | | Untreated catalyst | Terphenyl treated catalyst | Untreated catalyst | Terphenyl treated catalyst |
| Initial | 83 | 99.5 | 98.7 | 29.7 | 8.7 |
| Next | 167 | 99.1 | 98.6 | 2.8 | 3.1 |
| Do | 87 | 97.3 | 97.8 | 2.6 | 0.4 |

In comparison with the control, the treated catalyst displays markedly improved selectivity and substantially equivalent purification activity in eliminating p-carboxybenzaldehyde. In addition, the terphenyl-treated agent appears to have better aging characteristics than the biphenyl-treated catalyst evidenced in Example 7, especially in connection with p-carboxybenzaldehyde removal, and possibly selectivity also, even though its initial selectivity is not quite as good as that of the catalyst treated with biphenyl.

EXAMPLE 9

Purification runs are made with a portion of the same batch of 5% palladium on activated carbon untreated catalysts as the control and the two catalysts treated according to the procedures of Examples 3 and 4 with solutions of biphenyl. The reaction conditions are the same as those described earlier except for reducing the hydrogen charging rate to 2.0 s.c.f. per pound of the terephthalic acid and the crude acid feed rate of 36 grams per hour in obtaining the following data.

| | Wt. of TPA processed— g./g. of Pd/C catalyst | Percent PCB removal | | | Percent TPA loss | | |
|---|---|---|---|---|---|---|---|
| | | Untreated catalyst | 4.8 wt. percent biphenyl treated catalyst | 9.0 wt. percent biphenyl treated catalyst | Untreated catalyst | 4.8 wt. percent biphenyl treated catalyst | 9.0 wt. percent biphenyl treated catalyst |
| Initial | 83 | 99.7 | 99.3 | 99.7 | 36.0 | 26.6 | 25.8 |
| Next | 167 | 99.7 | 98.5 | 99.2 | 2.0 | 1.4 | 1.5 |

The selectivity of these solution-treated catalysts is considerably better than the control. In comparison with Example 7, it would seem that higher p-carboxybenzaldehyde conversion and longer catalyst life can be obtained by solution treatment at a substantial sacrifice in initial selectivity relative to the vapor pretreated catalyst.

EXAMPLE 10

The procedure of Example 9 is repeated with catalysts of the second batch pretreated with solutions of m-terphenyl as described in Examples 5 and 6 rather than biphenyl-treated catalysts. Upon analysis and computation, the following results are obtained.

|  | | Percent PCB removal | | | Percent TPA loss | |
|---|---|---|---|---|---|---|
| | Wt. of TPA processed— g./g. of Pd/C catalyst | Untreated catalyst | 4.9 wt. percent terphenyl treated catalyst | 9.6 wt. percent terphenyl treated catalyst | Untreated catalyst | 4.9 wt. percent terphenyl treated catalyst | 9.6 wt. percent terphenyl treated catalyst |
| Initial | 83 | 99.7 | 99.7 | 99.9 | 36.0 | 20.4 | 17.7 |
| Next | 167 | 99.7 | 99.4 | 99.0 | 2.0 | 1.8 | 2.4 |

The above results demonstrate a marked improvement in selectivity of the treated catalyst over the control in purification runs of limited duration.

EXAMPLE 11

In another catalyst treating procedure, the same type of palladium-carbon composite dispersed among the glass beads as a fixed bed of the aforesaid composition and volume is rapidly pretreated in situ in the reactor at 700° F. by passing a preheated vapor mixture consisting of 66.5% steam, 33.2% biphenyl and 0.3% hydrogen by volume through the bed for only 13 seconds using a total throughout of 10 grams of biphenyl.

Upon charging a vapor mixture of crude terephthalic acid, steam and hydrogen to this treated contact agent under purification reaction conditions similar to those of Example 7, a high degree of p-carboxybenzaldehyde removal results along with a distinct improvement in selectivity over that of the untreated catalyst. From the latter finding, it is apparent that substantial modification of the catalyst selectivity is obtainable in a brief exposure of the dispersed catalyst in situ to the biphenyl treating agent.

While the present invention has been described in considerable detail in a limited number of embodiments for the purpose of full disclosure, it will be apparent to those skilled in the art that many other modifications, variations and embodiments fall within its purview. Accordingly, this invention should not be construed as limited in any particulars except as may be recited in the appended claims or required by the prior art.

What is claimed is:

1. A process for the purification of terephthalic acid which comprises treating a dispersion of a crude terephthalic acid containing a minor proportion of p-carboxybenzaldehyde by contact of said dispersion with particles of a solid contact agent comprising a finely divided metal of Group VIII of the Periodic Table of Elements in the presence of hydrogen and a phenylbenzene, and thereafter separating from said dispersion a purified terephthalic acid of substantially lower p-carboxybenzaldehyde content than said crude acid.

2. A process according to claim 1 in which said contact agent is pretreated with said phenylbenzene prior to said purification process.

3. A process according to claim 1 in which said phenylbenzene is a terphenyl.

4. A process according to claim 1 in which said phenylbenzene is 1,3-terphenyl.

5. A process according to claim 1 in which said phenylbenzene is biphenyl.

6. A process according to claim 1 in which the charge contains at least about 0.2 standard cubic foot of gaseous hydrogen per pound of said crude acid.

7. A process according to claim 1 in which said metal is palladium.

8. A process according to claim 1 in which said contact agent comprises palladium having said phenylbenzene sorbed thereon by contact with a dispersion of a phenylbenzene of the group consisting of biphenyl and terphenyls prior to said purification process.

9. A process according to claim 8 in which the quantity of said sorbed phenylbenzene exceeds about 1% of the weight of palladium.

10. A process according to claim 8 in which said phenylbenzene is sorbed by said contact agent in an amount exceeding about 10% of the weight of palladium as a result of the pretreatment of a catalyst composite comprising palladium supported on extended form on particles of an inert solid carrier material with a sufficient amount of a dispersion of said phenylbenzene.

11. A process according to claim 10 in which palladium supported on carbon particles is contacted with a vapor phase dispersion of said phenylbenzene during said pretreatment.

12. A process according to claim 6 in which said crude terephthalic acid is in the vapor state at an elevated temperature insufficient for the substantial decomposition of terephthalic acid during said treatment, and the treated gaseous product mixture is thereafter cooled to condense at least a substantial proportion of the terephthalic acid vapor as a purified solid.

13. A process according to claim 12 in which said contact agent is suspended in finely divided particulate form in the gaseous mixture during said treatment and thereafter separated from said mixture prior to condensing the terephthalic acid.

14. A process according to claim 12 in which said dispersion of crude terephthalic acid includes a substantial amount of an inert gaseous substance.

15. A process according to claim 12 in which vaporized crude terephthalic acid is treated by contact at a temperature between about 600 and 800° F. with a contact agent comprising between about 0.001 and 15% by weight of palladium supported in extended surface area form on finely divided carbon particles and having a phenylbenzene of the group consisting of biphenyl and terphenyls sorbed on said agent in a quantity exceeding about 10% of the weight of said palladium in the presence of at least about 0.5 s.c.f. of hydrogen and at least about 0.06 mol of steam per pound of said crude acid, and the resulting treated gaseous mixture is thereafter cooled in the absence of said agent to condense at least a substantial proportion of terephthalic acid vapor as a purified solid.

References Cited

FOREIGN PATENTS

| 597,876 | 5/1960 | Canada | 260—525 |
| 726,213 | 1/1966 | Canada | 260—525 |

LORRAINE A. WEINBERGER, Primary Examiner

R. S. WEISSBERG, Assistant Examiner

U.S. Cl. X.R.

252—430